O. WHITE.
RESETTING MECHANISM FOR RECORDING TRAINS.
APPLICATION FILED JAN. 22, 1909.
936,591.
Patented Oct. 12, 1909.
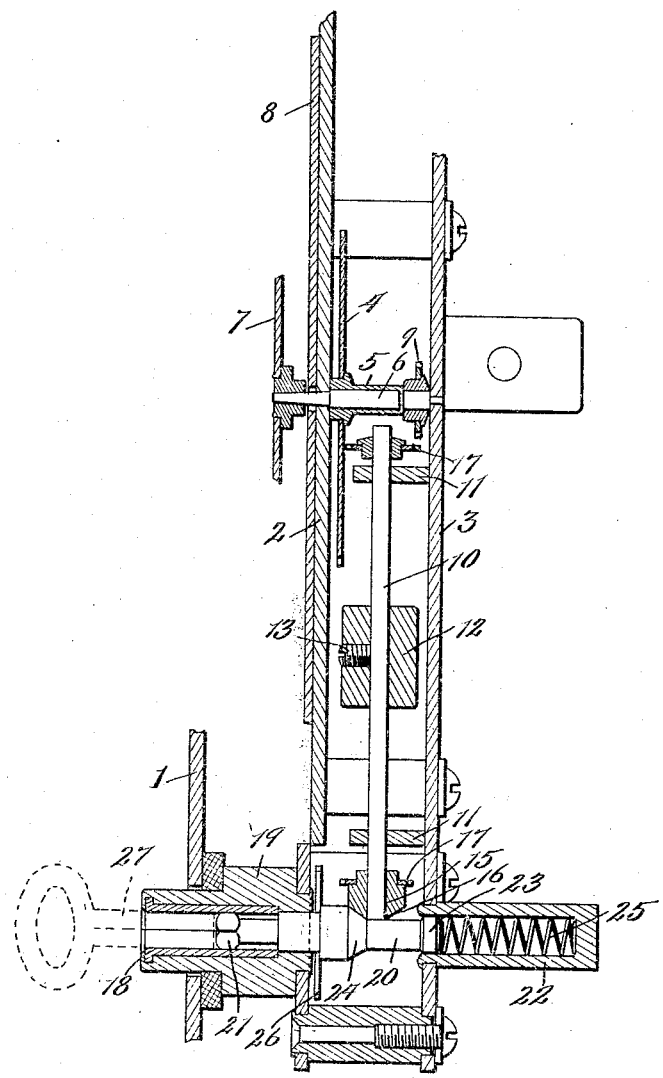

UNITED STATES PATENT OFFICE.

OTIS WHITE, OF SPRINGFIELD, ILLINOIS, ASSIGNOR TO SANGAMO ELECTRIC COMPANY, OF SPRINGFIELD, ILLINOIS, A CORPORATION OF ILLINOIS.

RESETTING MECHANISM FOR RECORDING-TRAINS.

936,591.  Specification of Letters Patent.  Patented Oct. 12, 1909.

Application filed January 22, 1909. Serial No. 473,712.

*To all whom it may concern:*

Be it known that I, OTIS WHITE, a citizen of the United States, residing at Springfield, in the county of Sangamon and State of Illinois, have invented certain new and useful Improvements in Resetting Mechanism for Recording-Trains, of which the following is a specification, reference being had to the accompanying drawings.

My invention relates to resetting mechanism for a recording train particularly adapted for use in meters in which it is desirable to set the indicating hand to zero or other point in the scale without disturbing the driving mechanism, although, of course, it may be used for other suitable purposes.

Its object is to provide a new and improved mechanism by which the indicator hand, driven by a time recording train of any character, as, for instance, the driving train of a meter, may be readily and easily moved back to zero, or any other point on the dial, after having been moved therefrom.

The figure indicates a vertical longitudinal section of my device, partly broken away, for the sake of clearness of illustration and showing only parts of well-understood portions of the meter or similar device to which it is applied.

Referring to the drawing,—1 indicates a portion of the casing of the meter, or other suitable instrument, to which my device is applied.

2—3 indicate the train-plates which carry the driving-train of which only one wheel, 4, is shown as the rest may be of any well-known and approved kind and description. The wheel 4 is mounted upon a sleeve 5, which is mounted upon a hand spindle 6 and frictionally engages the same so that when the wheel 4 is rotated the frictional contact between the sleeve 5 and the spindle 6 causes the spindle 6 to rotate. The spindle 6 is journaled in the train-plates 2 and 3 and carries upon its outer end a dial-hand 7 which is shown broken away.

8 indicates a dial-plate mounted on the outer surface of the train-plate 2.

9 indicates a pinion, which is suitably secured to the inner end of the spindle 6 which is within the inner surface of the train-plate 3.

10 indicating a vertical shaft, which is slidingly journaled in suitable bearings, as 11, carried by the train-plates 2—3 so as to slide freely longitudinally of itself therein.

12 indicates a weight adjustably mounted upon the vertical shaft 10 by means of a set-screw 13 and tending by its gravity to hold the shaft 10 in the position shown in the drawing and return the same to that position when free to act after the same has been lifted, as hereinafter described.

14 indicates a pinion, which is mounted upon the upper end of the shaft 10 and is adapted when the shaft is raised, as hereinafter described, to engage the pinion 9 so that when the shaft 10 is rotated, as hereinafter described, the spindle 6 will be rotated in either direction carrying the dial-hand 7.

15 indicates a cylindrical block, which is secured upon the lower end of the shaft 10 and has a beveled surface 16 on its lower end.

17 indicates a pinion carried on the block 15.

18 indicates a sleeve, which is rotatably mounted in a suitable bearing, as 19, carried by the frame 1 and has its inner surface squared or polygonal in section.

20 indicates a shaft carrying upon one end a head 21 which is squared or polygonal in section to correspond with the interior of the sleeve 18.

22 indicates a tubular casing, which is mounted in the train-plate 3 and which is adapted to slidingly receive a head 23 on the other end of the shaft 20. The tubular casing 22 is a cylindrical boring and the head 23 is circular in section so as to turn in said tubular casing 22. The shaft 20 is also journaled in the bearing 19. The shaft 20 is movable longitudinal of itself, therefore, in the sleeve 18, bearing 19 and tubular casing 22, and with the sleeve 18 is rotatable in said bearing.

24 indicates a beveled shoulder on the shaft 20 corresponding to the bevel 16 on the block 15, whereby when the shaft 20 is moved inward the beveled surface will coact to lift the shaft 10.

25 indicates a spiral spring, which is mounted in the tubular casing 22 between the head 23 of the shaft 20 and the end of the tubular bearing, tending to hold the parts in the position shown in the figure and to return the same when free to act after the shaft has been pushed inward against the action of the spring 25.

26 indicates a pinion, which is rigidly mounted on the shaft 20 and is adapted when said shaft is moved to the right in the figure against the action of the spring 25 and the shaft 10 is raised by the coacting of the beveled surfaces to be brought into mesh with the pinion 17 on the shaft 10, whereby when the sleeve 18 is rotated by any suitable key, as 27, placed therein the shaft 20 will be rotated and the shaft 10 with it.

The operation of my device is as follows: When the parts are in the position shown in the figure, the resetting device is out of operative engagement and the dial-hand 7 is driven through the driving pinion 4 and the frictional engagement of the sleeve 5 with the spindle 6. It being desired to set the hand back to zero, or to any other position on the scale, a suitable key 27 is inserted in the sleeve 18. As the key is thrust inward the shaft 20 is moved to the right in its bearings, compressing the spiral spring 25, and the beveled shoulder 24 being moved against the beveled surface 16 the shaft 10 is lifted against the action of the weight 12. The first operation of the lifting of the shaft is to bring the pinion 17 into mesh with the pinion 9,—the beveled faces 16 and 24 being of such size as to be just sufficient to lift the shaft 10 the desired distance to bring the two pinions 17 and 9 into mesh. In case the teeth should not properly register, a slight turning of the sleeve 18 will, by the friction of the beveled surfaces, sufficiently turn the shaft 10 to cause the pinions to register, and the further inward movement will bring them into mesh. This same movement of the shaft lifts the pinion 17 into position to register with the teeth of the pinion 26, the pinion 26 being made of such diameter that when the shaft is raised to bring the gears 17 and 9 into mesh the pinion 17 will lie in the position to have its teeth engage the teeth of the pinion 26 when the same is moved further inward by the further movement of the shaft 20. The pinions 17 and 9 being brought into mesh, a further movement of the shaft to the right by the further inward movement of the key 27 will move the teeth of the pinion 26 into mesh with the teeth of the pinion 17. The turning of the key 27 in either direction will then correspondingly rotate the sleeve 18 and with it the shaft 20. The shaft 20 will be rotated by the engagement of the pinion 26 with the pinion 17 and the engagement of the pinions 17 and 9 will cause the spindle 6 to be rotated in either direction carrying with it the dial-hand in one direction or the other to another point on the dial. When the hand is reset, as may be desired, the key is withdrawn. The spring 25 thereupon moves the shaft 20 back into original position and the weight 12 on the shaft 10 causes it to drop into normal position, disengaging the gearing and throwing it out of operative relation.

That which I claim as my invention, and desire to secure by Letters Patent, is,—

1. The combination with a support, a spindle, a sleeve frictionally engaging said spindle and adapted to be connected to a time-train, and a pinion on said spindle, of a shaft movable longitudinally of itself in said support, a pinion on the upper end of said shaft adapted by the longitudinal movement of said shaft to be brought into mesh with the pinion on said spindle, a second shaft journaled in said support and movable longitudinally of itself therein, coacting beveled surfaces carried by said shafts and adapted when said second shaft is moved to move said first shaft and cause the engagement of said pinions, and means for rotating said first shaft from said second shaft.

2. The combination with a support, a hand-spindle journaled therein, a friction sleeve on said hand-spindle adapted to be connected with a time-train, and a pinion on said spindle, of a shaft vertically carried in said support and movable longitudinally of itself therein, a pinion on the upper end of said vertical shaft, a head on the lower end of said vertical shaft and having a beveled surface, a horizontal shaft journaled in said support and movable longitudinally of itself therein, a beveled shoulder on said horizontal shaft adapted to coact with the beveled surface on said first shaft whereby, when said first shaft is moved in one direction to bring said beveled surfaces into sliding engagement, said vertical shaft will be lifted into mesh with the pinion on said spindle, and gearing connections between said two shafts.

3. The combination with a support, a hand-spindle journaled therein, a friction sleeve on said hand-spindle adapted to be connected with a time-train, and a pinion on said spindle, of a shaft vertically journaled in said support and movable longitudinally of itself therein, a sleeve rotatably carried by said support, a spring-seated horizontal shaft journaled in said support and longitudinally movable in said sleeve and said support, a beveled shoulder on said shaft adapted to coact with the beveled surface on said vertical shaft and to lift said vertical shaft to bring the pinion thereon into mesh with the pinion on said spindle when said horizontal shaft is moved inward against said spring, a pinion on the lower end of said vertical shaft, and a pinion on said horizontal shaft adapted to be brought into mesh with said last-named pinion when said shaft is moved inward against said spring.

4. In combination, a support, a dial-hand spindle journaled in said support, a friction-sleeve on said spindle adapted to be connected with a time-train, a weighted shaft vertically journaled in said support and movable longitudinally of itself therein, gearing connections on said vertical shaft and said spindle adapted to be brought into engagement when said vertical shaft is raised, a spring-seated horizontal shaft journaled in said support and movable longitudinally of itself therein, beveled bearings on said vertical shaft and said horizontal shaft adapted, when said horizontal shaft is moved in one direction, to lift said vertical shaft, and gearing on said vertical shaft and said horizontal shaft adapted to be brought into mesh with one another when said horizontal shaft is moved longitudinally of itself to lift said vertical shaft.

5. In combination, a support, a dial-hand spindle journaled in said support, a friction-sleeve on said hand-spindle adapted to be connected with a time-train, a weighted vertical shaft journaled in said support and movable longitudinally of itself therein, gearing on said spindle and the upper end of said vertical shaft adapted to be brought into mesh with one another when said vertical shaft is lifted, a horizontal sleeve rotatably mounted in said support and adapted to be turned by a suitable key, a horizontal shaft journaled in said support and adapted to engage said sleeve and movable longitudinally of itself in said sleeve on said support, a spring bearing on said horizontal shaft and adapted to yieldingly hold it in normal position, a beveled shoulder on said shaft adapted to engage the beveled surface on said vertical shaft and lift the same when said horizontal shaft is moved out of normal position against said spring, a pinion on the lower end of said vertical shaft, and a pinion on said horizontal shaft adapted when said horizontal shaft is moved out of normal position against the action of said spring to be brought into mesh with the pinion on the lower end of said vertical shaft.

6. In combination, a support, a dial-hand spindle journaled in said support and adapted to be frictionally driven by a time-train, a vertical shaft journaled in said support and movable longitudinally of itself therein, gearing on said spindle and said vertical shaft adapted to be brought into mesh when said vertical shaft is lifted, a horizontal shaft rotatably journaled in said support and movable longitudinally of itself therein, means for rotating said horizontal shaft, beveled bearings on said vertical shaft and said horizontal shaft adapted by the movement of said horizontal shaft in one direction to lift said vertical shaft, and means for rotating said vertical shaft from said horizontal shaft.

7. In combination, a support, a dial-hand spindle journaled in said support and adapted to be frictionally driven by a time-train, a vertical shaft journaled in said support and movable longitudinally of itself therein, gearing on said spindle and said vertical shaft adapted to be brought into mesh when said vertical shaft is lifted, a horizontal shaft rotatably journaled in said support and movable longitudinally of itself therein, means for rotating said horizontal shaft, beveled bearings on said vertical shaft and said horizontal shaft adapted by the movement of said horizontal shaft in one direction to lift said vertical shaft, and gearing carried by said horizontal and vertical shafts and adapted to be brought into mesh by the further movement of said horizontal shaft after said vertical shaft is lifted.

OTIS WHITE.

Witnesses:
R. C. LANPHIER,
J. H. HODDE.